United States Patent
Klasel

[11] 4,020,922
[45] May 3, 1977

[54] FILTER CATCHER

[76] Inventor: Dan E. Klasel, 5085 Woodale, Memphis, Tenn. 38118

[22] Filed: Jan. 8, 1976

[21] Appl. No.: 647,626

[52] U.S. Cl. .................. 184/1.5; 141/98; 141/314; 206/216; 229/55
[51] Int. Cl.² .................................. F16N 31/00
[58] Field of Search .......... 206/223, 216; 248/101; 229/55; 220/86 R, 85 SP, 9 F; 232/43.2; 141/98, 314, 328; 184/1.5

[56] References Cited
UNITED STATES PATENTS

| | | | |
|---|---|---|---|
| 661,681 | 11/1900 | Ashbaugh et al. | 141/328 |
| 667,216 | 2/1901 | Griffith | 141/328 |
| 2,073,914 | 3/1937 | Wilfley | 141/314 |
| 3,703,956 | 11/1972 | Oswalt | 206/223 |
| 3,710,930 | 1/1973 | Owdom | 220/9 F |
| 3,832,738 | 9/1974 | Kliemann | 220/85 SP |
| 3,874,478 | 4/1975 | Mantell, Jr. | 141/313 |

*Primary Examiner*—William T. Dixson, Jr.

[57] ABSTRACT

A tool for use by an automobile mechanic when changing an oil filter, and which prevents the mechanic from being burned by hot oil running out of the engine block; the tool consisting of an adapter to which a disposable plastic bag is attachable, the adapter and bag being fitted around a lower portion of the engine block and the downwardly depending oil filter which extends into the bag, thus permitting the mechanic to place a wrench around the outer side of the bag in order to grasp the oil filter, for unscrewing the same from the engine block, so that the removed oil filter then drops into the bag together with the dripping oil, so that the oil does not run out on the mechanic's arms.

2 Claims, 4 Drawing Figures

U.S. Patent May 3, 1977 4,020,922
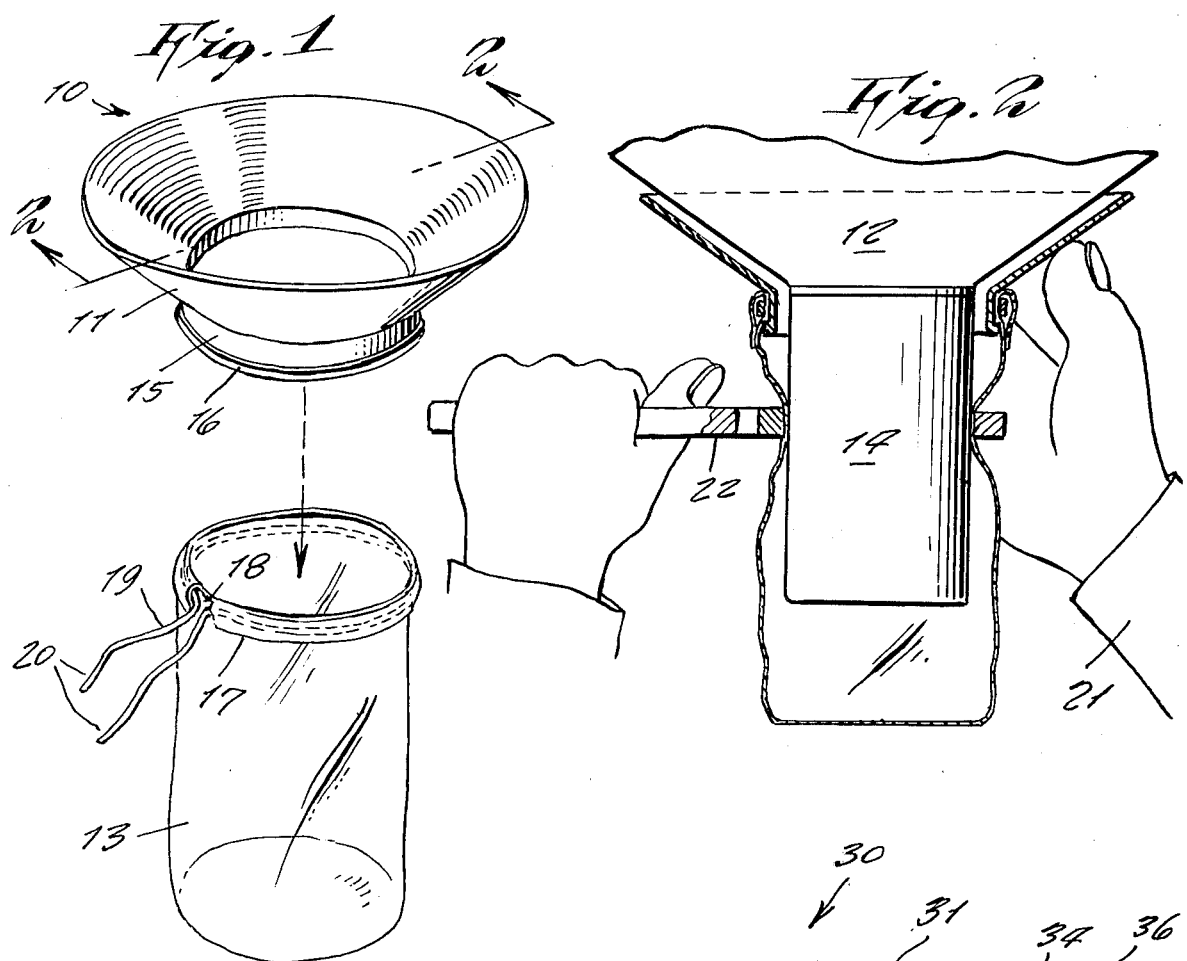
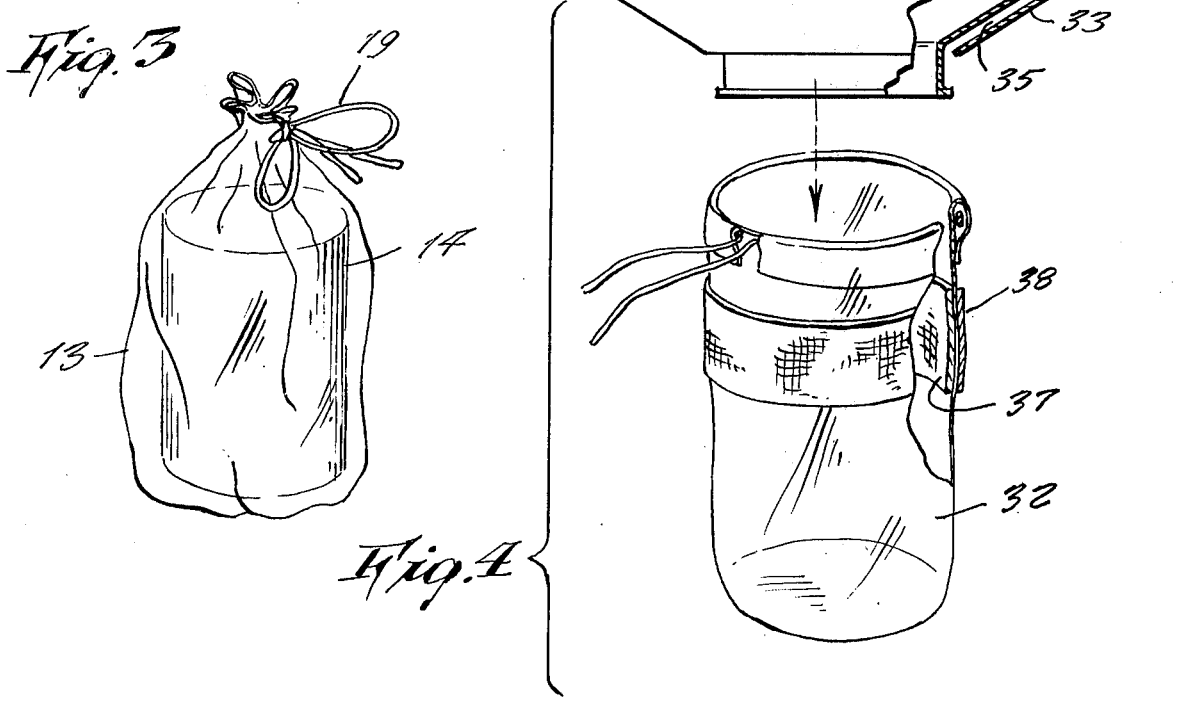

FILTER CATCHER

This invention relates generally to automobile mechanic tools.

It is generally well known to persons who are acquainted with automobile maintenance that the generally accepted method of removing an oil filter is the use of a filter wrench, which is a metal arm with a contracting metal band that tightens around the oil filter as the arm is pulled fore or aft, depending upon the threads of the filter where it attaches to the engine block. After the oil filter is sufficiently unscrewed from the engine block so that it can drop off, the hot oil will run out of the exposure thus formed by the removed oil filter so that the mechanic must be deft in getting out of the way so that the dripping oil does not run on the mechanic's arm and run down his forearm. This has a tendency of not only burning his arm, but it also stains his shirt. This situation is of course objectionable and is therefore in want of an improvement.

Accordingly, it is the principal object of the present invention to provide a filter catcher which permits the mechanic to loosen and remove the oil filter from the engine block, and which catches all the dripping and running oil, so that the mechanic does not come into physical contact with the same.

Yet another object is to provide a filter catcher which accordingly will permit the task to be done cleanly and without any danger of becoming burned by the hot oil.

Other objects are to provide a filter catcher which is simple in design, inexpensive to manufacture, rugged in construction, easy to use and efficient in operation.

These and other objects will be readily evident upon a study of the following specification and accompanying drawing, wherein:

FIG. 1 is a perspective view of an adapter and a plastic bag that together form the present invention;

FIG. 2 is a cross sectional view thereof, as viewed on line 2—2 of FIG. 1, and showing the invention components tied together and in use, removing a filter from under an engine;

FIG. 3 is a plastic bag, shown closed with a removed filter sealed inside;

FIG. 4 is a view generally similar to FIG. 1, and showing a modified design of the invention, in which the adapter has an additional protection against heat from the engine block when the adapter is held in a mechanic's hand during use, and wherein the bag additionally includes a string from the material for preventing the bag to burst when gripped by a filter wrench.

Reference is now made to the drawing in greater detail, and more particularly to FIGS. 1 through 3 thereof at this time, wherein the reference numeral 10 represents a filter catcher according to the present invention wherein there is an adapter 11 for fitting around a lower end of an engine block 12, and a plastic, transparent bag 13 which is attachable to the adapter and which is able to receive therein the oil filter 14 which is screwed to the lower end of the engine block 12.

The adapter 11 comprises a flange made of metal or the equivalent, and which may be made in any different shape or configuration, in order to suit the particular shape of the lower portion of the engine block to which it is intended to be fitted. The lower end of the adapter 11 has a circular annular groove 15 formed by means of a diametrically enlarged bead 16 around a lower terminal end of the adapter, the annular groove 15 providing a means for attachment of the plastic bag 13 thereto.

The bag 13, made of transparent plastic, includes a hemmed over upper edge 17 so to form a circular groove 18 within which a drawstring 19 is contained. The opposite end 20 of the drawstring extend outwardly of the groove 18 by means of a cutaway portion, thus permitting the opening thus formed at the upper end of the bag to be pulled tightly around the annular groove 15 of the adapter 11. With the bag thus fitted around the annular groove, the opposite ends 20 of the drawstring can then be tied together, in order to firmly secure the same to the adapter.

In this position, a mechanic 21 can then fit the adapter against the underside of the engine block 12 and the bag receive the oil filter 14, as is clearly shown in FIG. 2. The mechanic then takes a filter wrench 22 and fits it around the outer side of the bag, and thus, by grasping the bag, he grasps the oil filter contained within the bag, so that by turning the filter wrench, he can unscrew the oil filter from the engine block. When the oil filter is thus unscrewed from the engine block, the oil filter will drop down into the bottom of the bag, and oil will drip and run into the bag, so that none of the oil gets upon the mechanic's hands and runs down his arms. After the oil filter is thus removed, the drawstring is loosened from the adapter, and the drawstring is then pulled tight so to close the bag, as shown in FIG. 3, and the opposite ends 20 of the drawstring are then tied into a knot. The disposal bag, together with the discarded oil filter and oil drippings, are now easily carried to a refuse can where they are discarded. Thus a mechanic's hands are kept clean and free from becoming burned.

Reference is now made to FIG. 4 of the drawing, wherein there is a modified design of the filter catcher 30 that includes an adapter 31 and a disposable, transparent bag 32.

In this form of the invention, the adapter 31 is similar to the above described adapter 11 except that it additionally includes a flange 33 formed around the outer side of a side wall 34, which is adaptable to rest against the side of the engine block 12. Thus in this form of the invention, in case the wall 34 becomes hot from engaging the hot engine block, the mechanic will not burn his hand because his hand grasps the flange 33, rather than the wall 34. An air space 35, between the flange and wall 34, provides insulation to prevent transmitting heat from the wall to the flange. The flange is formed integrally with the wall 34 by means of a bend 36 at the upper end of the adapter.

The disposable bag 32 differs from the above described disposable bag 13, by additionally including a tape of fabric material secured to both the inner side and outer side of the bag as shown at 37 and 38 respectively, the tapes of fabric being located in the position where the filter wrench 22 is most likely used to grasp the bag. The tape of fabric cushions the plastic bag therebetween, so that the wrench does not tear open the plastic bag while turning the oil filter. Thus a modified design of the invention is provided.

While various changes may be made in the detail construction, it is understood that such changes will be within the spirit and scope of the present invention as is defined by the appended claims.

What I now claim is:

1. A filter catcher, comprising in combination, an adapter for fitting around a lower end of an engine block, and a disposable plastic bag attachable to said adapter, said bag serving to catch dripping oil and an oil filter, said adapter having an annular groove around its outer side for receiving an upper edge of said bag; and a tape of fabric material secured to an inner side of said bag a second tape of fabric material being secured to an outer side of said bag, said tapes being aligned in position with each other and forming protective cushions for the portion of said bag that is between said inner and said outer tapes, said outer tape protecting said bag portion from a wrench applied therearound, and said inner tape protecting said bag portion from a surface of said oil filter while being squeezed by said wrench and prevent tearing said bag by said oil filter surface.

2. The combination as set forth in claim 1, wherein said adapter includes parallel outer and an inner walls, an insulation space between said inner and said outer wall, said outer wall providing a means for being grasped by a mechanic's hands.

* * * * *